(12) United States Patent
Bill

(10) Patent No.: US 6,554,373 B1
(45) Date of Patent: *Apr. 29, 2003

(54) MOTOR VEHICLE HYDRAULIC BRAKING SYSTEM

(75) Inventor: Karlheinz Bill, Dreieich (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/930,166

(22) PCT Filed: Apr. 5, 1995

(86) PCT No.: PCT/EP95/01237
§ 371 (c)(1),
(2), (4) Date: Jul. 31, 1998

(87) PCT Pub. No.: WO96/31374
PCT Pub. Date: Oct. 10, 1996

(51) Int. Cl.[7] .................................................. B60T 8/44
(52) U.S. Cl. ................................ 303/114.3; 303/115.3; 303/113.4; 91/376 R; 91/369.1
(58) Field of Search ................ 92/96, 98 R; 91/376 R, 91/369.1, 369.2; 303/114.3, 115.3, 113.4, 174

(56) References Cited

U.S. PATENT DOCUMENTS

| | | | | |
|---|---|---|---|---|
| 4,667,471 A | * | 5/1987 | Fulmer et al. ............... 180/282 |
| 4,826,255 A | * | 5/1989 | Volz ........................ 303/113.4 |
| 4,978,820 A | * | 12/1990 | Levrai et al. ............. 200/82 D |
| 5,096,267 A | * | 3/1992 | Volz ........................ 303/113.3 |
| 5,115,186 A | * | 5/1992 | Reinartz et al. ......... 188/1.11 E |
| 5,197,788 A | * | 3/1993 | Fennel et al. ............ 188/181 A |
| 5,224,410 A | * | 7/1993 | Graichen et al. .......... 91/369.1 |
| 5,261,312 A | * | 11/1993 | Bornemann et al. ...... 91/376 R |
| 5,261,730 A | * | 11/1993 | Steiner et al. ........... 303/113.4 |
| 5,350,225 A | * | 9/1994 | Steiner et al. ........... 303/113.4 |
| 5,401,084 A | * | 3/1995 | Volz ........................ 303/113.2 |
| 5,460,074 A | * | 10/1995 | Balz et al. ................. 91/369.1 |
| 5,586,814 A | * | 12/1996 | Steiner ..................... 303/113.1 |
| 5,941,609 A | * | 8/1999 | Wagner et al. ........... 303/113.4 |
| 5,967,624 A | * | 10/1999 | Graber et al. ............ 303/113.4 |

FOREIGN PATENT DOCUMENTS

| | | | |
|---|---|---|---|
| DE | 40 04 065 | 8/1991 | |
| DE | 41 02 497 | 5/1992 | |
| DE | 42 08 496 | 8/1993 | |
| DE | 4410699 A1 | * 10/1995 | ............ B60Q/1/44 |
| WO | 91/08131 | 6/1991 | |
| WO | 94/11226 | 5/1994 | |

OTHER PUBLICATIONS

Magazine Article: ATZ Automobiltechnische Zeitschrift, vol. 97, No. 1, Jan. 1995; pp. 36–37, XP 000486418; J. Pickenhahn 'Elecktronisch geregelter Bremskraftverstärker'.

* cited by examiner

Primary Examiner—Jack Lavinder
Assistant Examiner—Robert A Siconolfi
(74) Attorney, Agent, or Firm—Rader, Fishman & Grauer PLLC

(57) ABSTRACT

The present invention discloses a brake system for automotive vehicles including a vacuum brake power booster which is operable preferably by a solenoid irrespective of the actuation by the driver.

In order to sense the actuating speed during actuation introduced at a brake pedal by the driver, the present invention provides a travel sensor of proportional operation which is operable by the axial movement of the movable wall of the vacuum brake power booster, and the output signal of the travel sensor is directly proportional to the actuating travel of the movable wall and is subjected to a time differentiation processing operation in an electronic control unit.

17 Claims, 3 Drawing Sheets

MOTOR VEHICLE HYDRAULIC BRAKING SYSTEM

BACKGROUND OF THE INVENTION

The present invention relates to a hydraulic brake system for automotive vehicles including an actuating unit comprising a master brake cylinder and a preceding vacuum brake power booster operable by a brake pedal, wheel brakes which are connected to the pressure chambers of the master brake cylinder by the intermediary of an ABS hydraulic unit, wheel brakes which are connected to the pressure chambers of the master brake cylinder by the intermediary of an ABS hydraulic unit, a brake light switch which interacts with the brake pedal, an electric switching device which permits identification of the driver's wish to the end of reducing the braking effect, a sensor device for sensing the brake pedal actuating speed, and an electronic control unit which is furnished with the electric signals of the brake light switch, the electric switching device and the sensor device, and the output signals of which permit activating a pneumatic valve, which controls the build-up of a pneumatic differential pressure in the housing of the vacuum brake power booster, irrespective of the operation by the driver, to the effect of full braking.

A brake system of this type is disclosed in German patent No. 42 08 496, for example. The means of sensing the actuation speed in the state of the art brake system is associated with the brake pedal and, preferably, is a pedal position sensor configured as an angle sensor. The above mentioned switching device is arranged in the area of articulation of, the actuating rod to the brake pedal and is configured as a relative motion sensor. The arrangement of the two sensor devices in the driver's leg room causes considerable cost of assembly which is especially due to the fact that a cable tree must be positioned in the mentioned area. Further, there is the imminent risk that the function of the prior art sensor devices is impaired e.g. by contaminants or moisture in the driver's leg room.

Therefore, an object of the present invention is to improve a hydraulic brake system of the previously mentioned type so that assembly costs, in particular related to installation of the brake system, are considerably reduced and reliability of its operation is additionally increased.

SUMMARY OF THE INVENTION

According to the present invention, this object is achieved because the sensor device is configured as a travel sensor of analog operation which is operable by the axial movement of the movable wall of the vacuum brake power booster, the output signal of the travel sensor being directly proportional to the actuating travel of the movable wall and being subjected to a time differentiation processing operation in the electronic control unit. It is particularly appropriate when the travel sensor is a linear potentiometer.

In an embodiment of the present invention related to a particularly compact size, the pneumatic valve is the control valve of the vacuum brake power booster which is operable by the brake pedal and is additionally operable by electro-mechanical means adapted to be driven by the electronic control unit.

In a preferred aspect of the subject matter of the present invention, the electromechanical means is a solenoid and a sealing seat of the control valve interacting with the solenoid. The solenoid is a component part of a valve piston which is in a force-transmitting connection with the brake pedal. It is achieved by these measures that the electric lines leading to the travel sensor may be integrated in the cable which extends to the solenoid. This ensures that space is optimally used.

In another preferred aspect of the present invention which permits low-cost manufacture, the electric switching device is arranged in a control housing accommodating the control valve. Preferably, the switching device includes a microswitch on the valve piston and an actuating element which is slidable in the control housing and bears against a stop on the booster housing in the inactive position of the vacuum brake power booster.

Identification of the position of the brake pedal is important for the proper functioning of the independent-force-assisted brake system of the present invention because the release threshold for the independent actuation varies with an increasing brake pedal travel. The actual position of the brake pedal, however, is a function of the vacuum prevailing in the housing of the vacuum brake power booster, which causes advance movement of the movable wall generating the boosting force, and of the degree of venting of the brake system. The travel sensor must be calibrated, i.e. its zero point or initial point must be defined, with respect to the importance of the absolute pedal travel. However, one-time calibration during the assembly of the device is not sufficient, because shifts caused by wear may occur in the service life of the system. Also, a variation of the position of the travel sensor in its attachment is not identified in a one-time calibration of the travel sensor. Therefore, the electronic control unit has a means in another preferred aspect of the present invention which permits a continuous calibration of the travel sensor. The sensed calibration value (zero point of the travel sensor) is stored preferably in dependence on the switch condition of the brake light switch and the electric switching device, or only if both the brake light switch and the electric switching device are in their non-actuated condition.

The reliability in operation of the brake system of the present invention is further increased by a means of the electronic control unit which permits identifying the calibration performed.

Further details, features and advantages of the present invention can be seen in the following description of an embodiment, making reference to the accompanying drawings in which individual parts corresponding to each other have been assigned like reference numerals.

DETAILED DESCRIPTION OF THE DRAWINGS

Figure 1:
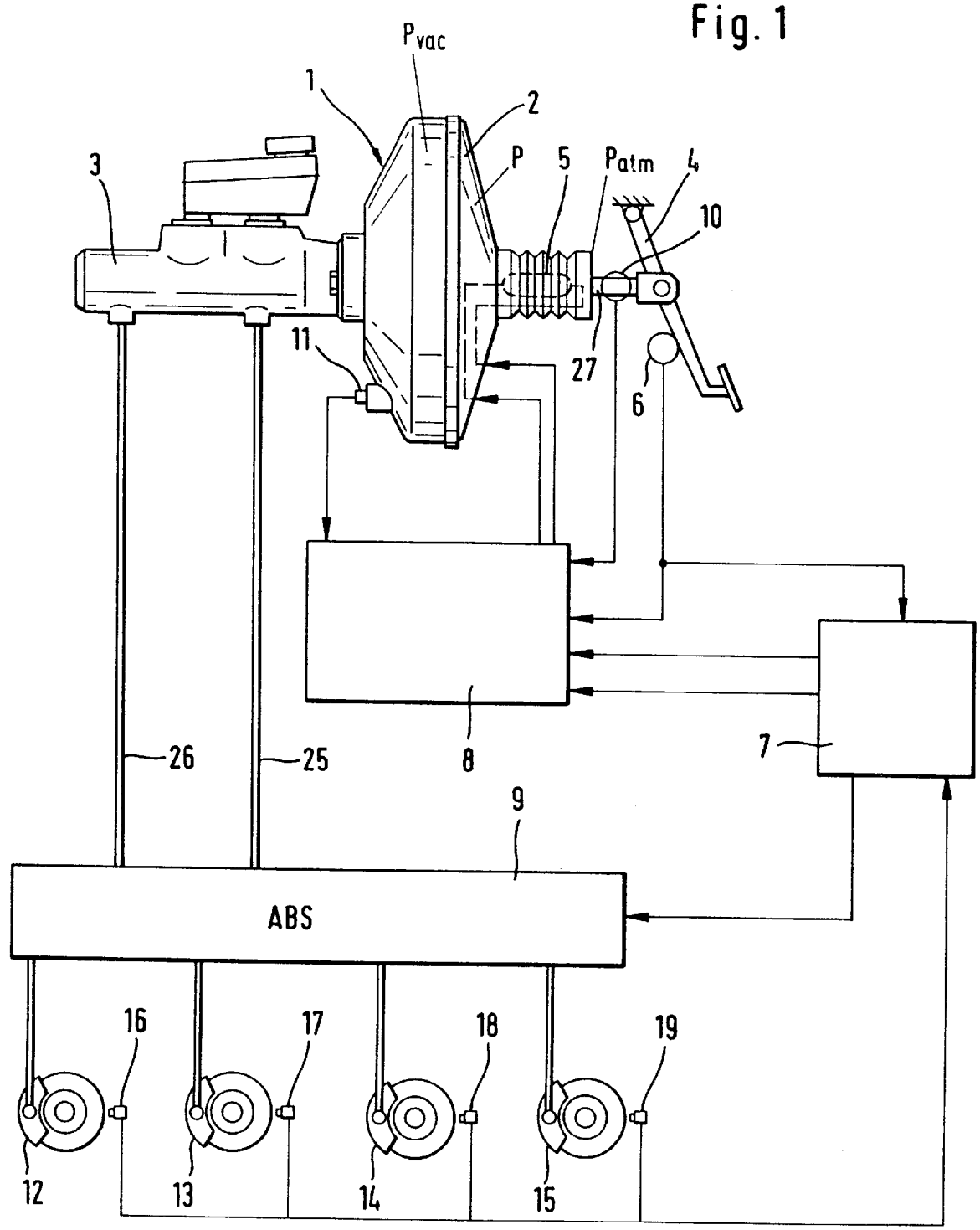
FIG. 1 is a schematic view of a design of the brake system according to the present invention.

The brake system for automotive vehicles of the present invention shown in FIG. 1 generally includes an actuating unit 1, an electronic control unit 8, wheel brakes 12, 13, 14, 15, an ABS/hydraulic unit or pressure modulator 9 interposed between the wheel brakes 12 to 15 and the actuating unit 1, and an anti-lock/traction slip controller 7 interacting with the electronic control unit 8 and producing control signals for the pressure modulator 9. Associated with each of the vehicle wheels (not shown) is a wheel sensor 16, 17, 18, 19 having a control signal representative of the wheel speed which is supplied to the anti-lock/traction slip controller 7. The actuating unit 1, in turn, includes a pneumatic brake power booster, preferably a vacuum brake power booster 2, operable by a brake pedal 4. Connected downstream of brake power booster 2 is a master brake cylinder 3, preferably a tandem master cylinder, having pressure chambers (not shown) which are connected to the pressure modulator 9 by way of hydraulic lines 25, 26. An actuating rod 27 is coupled to the brake pedal 4 and permits operation of a control valve 5 (shown only schematically) which governs the build-up of a pneumatic differential pressure in the housing of the vacuum brake power booster 2. A solenoid 22 which is drivable by control signals of the electronic control unit 8 (FIG. 2) permits independent operation of the control valve 5 irrespective of the actuation introduced at the brake pedal 4.

A brake light switch 6 which is operatively connected to the brake pedal 4 permits identifying an actuation introduced at the brake pedal 4, and the actuating speed is sensed by a sensing device which preferably includes a travel sensor 11 of analog operation that is associated with the vacuum brake power booster 2. The travel sensor 11 whose output signals are delivered to the electronic control unit and are evaluated in this unit during the first period of brake actuation as a basis of decision for the active brake management can preferably be configured as a linear potentiometer. The assessment of the pedal application gradient is effected in the electronic control unit 8 by producing the time variation of the analog signals of the potentiometer. When the so found value exceeds a previously defined limit value, the control unit 8 will generate a control signal to drive the solenoid 22 actuating the control valve 5.

To ensure that the solenoid 22 is reliably deactivated after termination of the braking operation assisted by independent force, an electric switching device 10 is provided which is shown only schematically in FIG. 1.

Figure 2:
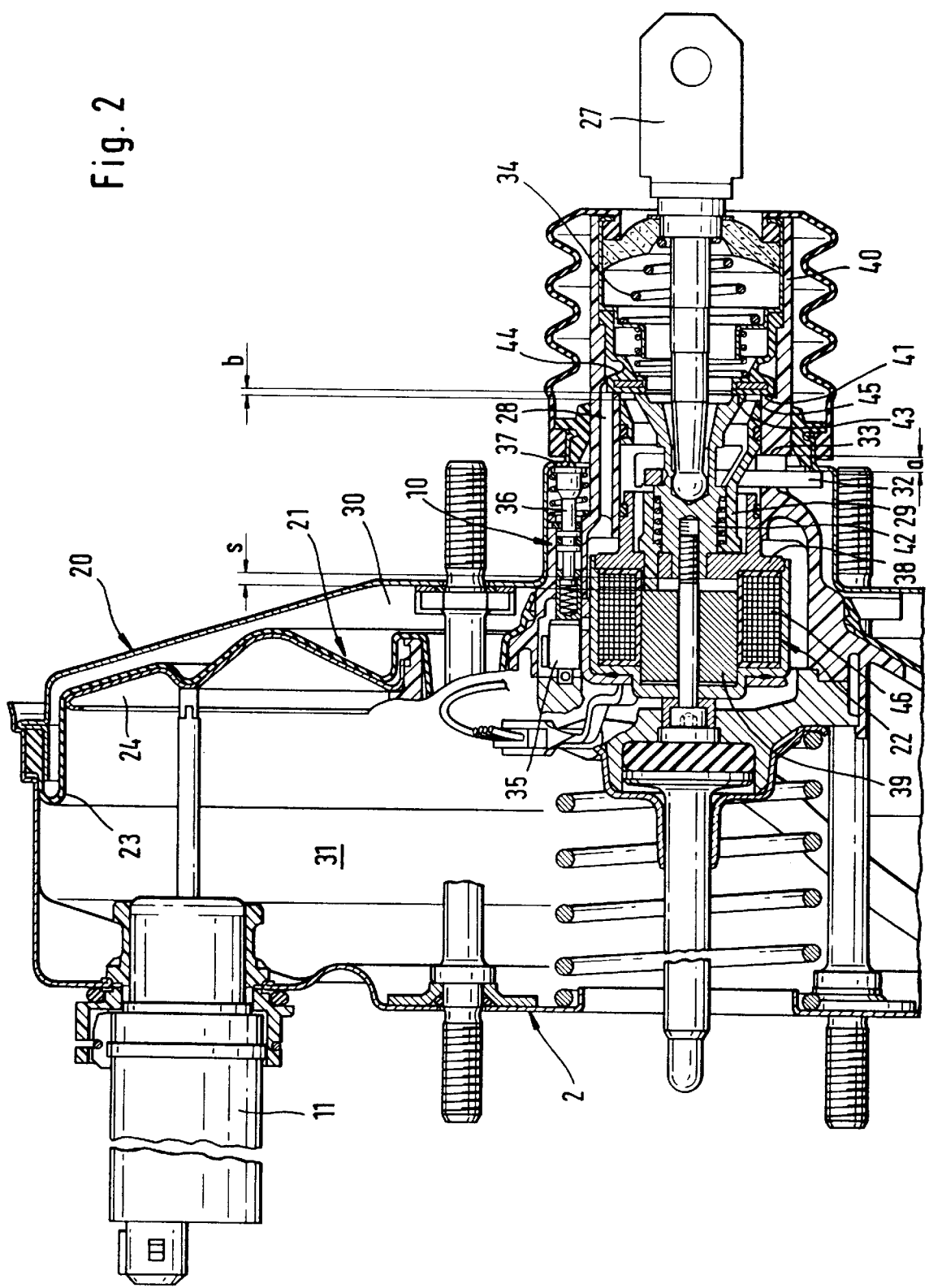
FIG. 2 is an axial cross-sectional view, partially broken away, of a design of the pneumatic brake power booster adapted to be used in the brake system of the present invention of FIG. 1.

As can be taken from FIG. 2 in particular, the booster housing 20 of the vacuum brake power booster 2 shown in FIG. 1 is subdivided into a working chamber 30 and a vacuum chamber 31 by an axially movable wall 21. The axially movable wall 21 has a sheet-metal deepdrawn diaphragm retainer 24 and a flexible diaphragm 23 which abuts on the retainer. Diaphragm 23 is configured as a rolling bead for providing a seal between the outside periphery of the diaphragm retainer 24 and the booster housing 20.

The control valve 5 operable by the actuating rod 27 is accommodated in a control housing 40 sealed and guided in the booster housing 20 and carrying the movable wall 21. Control valve 5 has a first sealing seat 41 on the control housing 40, a second sealing seat 43 that is provided on the valve piston 42 connected to the actuating rod 27, and a valve member 44 cooperating with both sealing seats 41, 43. The working chamber 30 is adapted to be connected to the vacuum chamber 31 by way of a channel 28 which extends laterally in the control housing 5.

To initiate the above mentioned operation of the brake power booster 2 independent of the actuating rod 27, a third sealing seat 45 is interposed radially between the first (41) and the second sealing seat 43. Sealing seat 45 is operable by way of the solenoid 22 which is slidable in the control housing 40 along with the valve piston 42.

The solenoid 22 includes a coil 46, slipped onto a guide member 38 connected to the valve piston 42, and a cylindrical armature 39 slidable in the coil. Armature 39 is in a force-transmitting connection with a sleeve 29 sealed in the control housing 40. The third sealing seat 45 is provided on sleeve 29. This permits transmission of the independent actuating force generated by the solenoid 22 to the third sealing seat 45. The third sealing seat 45 is axially offset (see distance 'b') with respect to the second sealing seat 43 provided on-the valve piston 42.

In an independent braking operation initiated by energization of the coil 46, the armature 39 is displaced to the right in the drawing, with the result that the third sealing seat 45 moves into abutment with the sealing surface of the valve member 44 after having overcome the distance 'b'. The first sealing seat 41 on the control housing 40 is bridged in terms of effect by this abutment so that the connection between the pneumatic chambers 30, 31 of the brake power booster 2 is eliminated. Subsequently, the third sealing seat 45 and the valve member 44 continue in joint motion, the second sealing seat 43 is opened, and the ventilatable chamber 30 of the brake power booster 2 is ventilated. The movement of the third sealing seat 45 continues until the armature 39 abuts the guide member 38 and the slot 's' between the two parts becomes zero. In the absence of actuating force on the actuating rod 27, the control housing 40 will advance in relation to the valve piston 42 by a distance which corresponds to the distance 'a' between a transverse member 32, limiting the movement of the valve piston 42, and a stop surface 33 on the control housing 40. This is due to a piston rod return spring 34 which moves the valve piston 42 to the right by way of the actuating rod 27 and tends to close the second sealing seat 45 again. Because the third sealing seat 28 is moved synchronously due to the rigid connection between the solenoid 22 and the valve piston 42, the slot between the valve member 44 and the second sealing seat 43 is kept open, more precisely, by the amount 's-b'. The ventilatable working chamber 30 of the brake power booster 2 is thereby connected to the atmosphere, and brake force is generated.

As can finally be seen in FIG. 2, the above mentioned switching device 10 includes a microswitch 35, which is preferably attached to the valve piston 42 and has two switch positions, and an actuating element 36 actuating the microswitch 35 by a translatory movement. Actuating element 36 is sealed and guided in a bore in the control housing 40 and interacts with a stop on the booster housing. The stop is assigned reference numeral 37 and can be provided e.g. by a radial collar of the rear booster housing bowl.

Figure 3:
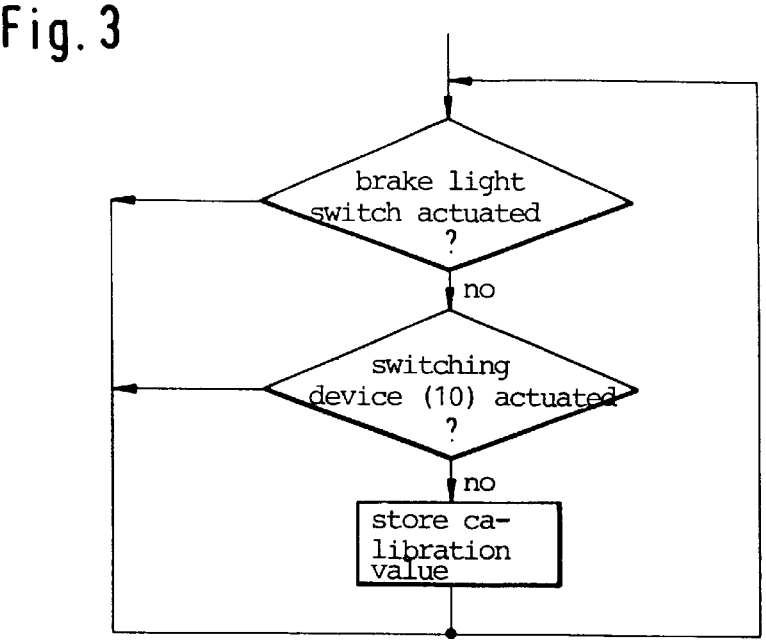
FIG. 3.

The necessity of a continuous calibration of the travel sensor 11 has already been mentioned in the introductory part of the description. For this reason, the electronic control unit 8 continuously receives the condition variables of the travel sensor 11, the brake light switch 6 and the electric switching device 10. The zero point or initial point of the travel sensor is set or stored when neither the brake light switch 6 nor the electric switching device 10 is in its operated condition. The calibration value remains unchanged from the moment of variation of the switching condition of the brake light switch 6 or the electric switching device 10. The procedere described can be taken from FIG. 3 of the drawing.

Figure 4:
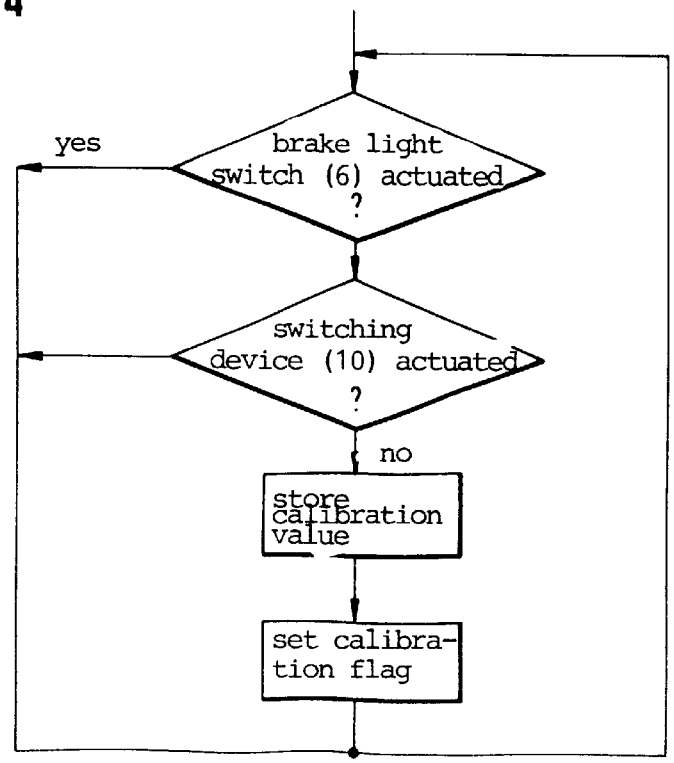
FIG. 4 are two flow charts showing functional sequences which occur in the electronic control unit during calibration.

By way of a calibration flag, the modified procedere shown in FIG. 4 can be used to examine whether calibration of the travel sensor 11 was possible at all after the last independent actuation of the brake system of the present invention, or whether there is a defect of the respective sensor equipment. This measure prevents the independent actuation of the vacuum brake power booster 2 in a simple fashion if the mentioned sensor equipment fails.

The above mentioned measures permit an early trouble detection of travel sensor 11, brake light switch 6 and switching device 10. Another advantage is that the calibration performed takes place irrespective of the vacuum prevailing in the booster housing.

General variations of the basic actuation value or small displacements of the travel sensor 11 are compensated. Further, the described dynamic calibration eliminates errors in the absolute measured value of: the travel sensor 11 which can be caused by irregular movements of the movable wall 21 of the vacuum brake power booster 2.

List of Reference Numerals 1 actuating unit
2 brake power booster
3 master brake cylinder
4 brake pedal
5 control valve
6 brake light switch
7 anti-lock/traction slip controller
8 control unit
9 ABS-hydraulic unit
10 switching device
11 travel sensor
12 wheel brake
13 wheel brake
14 wheel brake
15 wheel brake
16 wheel sensor
17 wheel sensor
18 wheel sensor
19 wheel sensor
20 booster housing
21 wall
22 solenoid
23 rolling diaphragm
24 diaphragm retainer
25 line
26 line
27 actuating rod
28 channel
29 sleeve
30 working chamber
31 vacuum chamber
32 transverse member
33 abutment surface
34 piston rod return spring
35 microswitch
36 actuating element
37 stop
38 guide member
39 armature
40 control housing
41 sealing seat
42 valve piston
43 sealing seat
44 valve member
45 sealing seat
46 coil

What is claimed is:

1. A vacuum power booster with an actuating rod adapted to be connected to an actuating pedal, comprising:
    a housing, a sensor device for sensing the speed of a booster actuation, and
    an electronic control unit providing output signals which permit activating a pneumatic valve, in order to control the build-up of a pneumatic differential pressure in the housing of the vacuum brake power booster, irrespective of the operation of the rod, wherein the sensor device is configured as a travel sensor of proportional operation which is operable by a movement of a movable wall of the vacuum brake power booster, the output signal of the travel sensor being directly proportional to the actuating travel of the movable wall and being subjected to a time differentiation processing operation in the electronic control unit,
    wherein an electric switching device is arranged in a control housing accommodating the control valve to detect whether the control valve is operated by the rod.

2. The booster as claimed in claim 1, wherein the travel sensor is a linear potentiometer.

3. The booster as claimed in claim 1, wherein the pneumatic valve is a control valve of the vacuum brake power booster which is operable by the rod and is additionally operable by an electromechanical means drivable by the electronic control unit.

4. The booster as claimed in claim 3, wherein the electromechanical means is a solenoid and a sealing seat of the control valve interacting with the solenoid.

5. The booster as claimed in claim 4, wherein the solenoid is a component part of a valve piston which is in a force-transmitting connection with the rod.

6. The booster as claimed in claim 1, wherein the electric switching device includes a microswitch arranged on the valve piston and an actuating element which is slidable in the control housing and bears against a stop on the booster housing in an inactive position of the vacuum brake power booster.

7. The booster as claimed in claim 1, wherein the electronic control unit has a means which permits a continuous calibration of the travel sensor.

8. The booster as claimed in claim 7, wherein a calibration value is stored in the electronic control unit in dependence on the switch condition of a brake light switch and an electric switching device.

9. The booster as claimed in claim 8, wherein the calibration value is stored only if the brake light switch and the electric switching device are in a non-actuated condition.

10. The hydraulic brake system as claimed in claim 7, wherein the electronic control unit has a means which permits identifying the calibration performed.

11. A hydraulic brake system for automotive vehicles including an actuating unit comprising a master brake cylinder with pressure chambers and a preceding vacuum brake power booster operable by a brake pedal,
    wheel brakes which are connected to the pressure chambers of the master brake cylinder by the intermediary of an ABS-hydraulic unit,
    an electric switching device which permits identification of a pedal-actuated braking operation,
    a sensor device for sensing the brake pedal actuating speed, and
    an electronic control unit which is furnished with output signals of a brake light switch, the electric switching device and the sensor device, and providing output signals which permit activating a pneumatic valve controlling the build-up of a pneumatic differential pressure in the housing of the vacuum brake power booster, irrespective of the operation of the brake pedal, to the effect of full braking, wherein the sensor device is configured as a travel sensor of proportional operation which is operable by the axial movement of a movable wall of the vacuum brake power booster, the output signal of the travel sensor being directly proportional to the actuating travel of the movable wall and being subjected to a time differentiation processing operation in the electronic control unit, wherein the electric switching device is arranged in a control housing accommodating the control valve.

12. The hydraulic brake system as claimed in claim 11, wherein the travel sensor is a linear potentiometer.

13. The hydraulic brake system as claimed in claim 11, wherein the pneumatic valve is a control valve of the vacuum brake power booster which is operable by the brake pedal and is additionally operable by an electromechanical means drivable by the electronic control unit.

14. The hydraulic brake system as claimed in claim 13, wherein the electromechanical means is a solenoid and a sealing seat of the control valve interacting with the solenoid.

15. The hydraulic brake system as claimed in claim 14, wherein the solenoid is a component part of a valve piston which is in a force-transmitting connection with the brake pedal.

16. The hydraulic brake system as claimed in claim 11, wherein the electric switching device includes a microswitch arranged on the valve piston and an actuating element which is slidable in the control housing and bears against a stop on the booster housing in the inactive position of the vacuum brake power booster.

17. A vacuum power booster with an actuating rod adapted to be connected to an actuating pedal, including a housing and a sensor device for sensing the speed of a booster actuation, and an electronic control unit providing output signals which permit activating a pneumatic valve, in order to control the build-up of a pneumatic differential pressure in the housing of the vacuum brake power booster, irrespective of the operation of the rod, wherein the sensor device is configured as a travel sensor of proportional operation which is operable by a movement of a movable wall of the vacuum brake power booster, the output signal of the travel sensor being directly proportional to the actuating travel of the movable wall and being subjected to a time differentiation processing operation in the electronic control unit, wherein the electronic control unit has a means which permits a continuous calibration of the travel sensor, wherein the electronic control unit has a means which permits identifying the calibration performed.

* * * * *